United States Patent
Ma et al.

(10) Patent No.: US 12,034,279 B2
(45) Date of Patent: Jul. 9, 2024

(54) POWER CONVERSION APPARATUS AND POWER SYSTEM

(71) Applicant: Huawei Digital Power Technologies Co., Ltd., Shenzhen (CN)

(72) Inventors: Cheng Ma, Dongguan (CN); Xiaoke Ran, Dongguan (CN); Hongbing Wang, Dongguan (CN); Wei Guo, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 210 days.

(21) Appl. No.: 17/405,787

(22) Filed: Aug. 18, 2021

(65) Prior Publication Data

US 2021/0376578 A1    Dec. 2, 2021

Related U.S. Application Data

(63) Continuation of application No. PCT/CN2020/075900, filed on Feb. 19, 2020.

(51) Int. Cl.
  *H02B 1/20*    (2006.01)
  *H02J 5/00*    (2016.01)
  *H02M 7/04*    (2006.01)

(52) U.S. Cl.
  CPC ............ *H02B 1/20* (2013.01); *H02J 5/00* (2013.01); *H02M 7/04* (2013.01)

(58) Field of Classification Search
  CPC ............ H02B 1/20; H02M 7/04; H02J 5/00
  USPC .................................................. 307/31, 147
  See application file for complete search history.

(56) References Cited

U.S. PATENT DOCUMENTS

| | | | |
|---|---|---|---|
| 7,024,649 B2 * | 4/2006 | Collmeyer | G06F 30/00 716/139 |
| 2009/0160259 A1 | 6/2009 | Naiknaware et al. | |
| 2016/0049794 A1 | 2/2016 | Liu et al. | |
| 2017/0201122 A1 | 7/2017 | Arduini et al. | |
| 2019/0273366 A1 * | 9/2019 | Huang | H05K 7/1492 |

FOREIGN PATENT DOCUMENTS

| | | |
|---|---|---|
| CN | 201717665 U | 1/2011 |
| CN | 103023131 A | 4/2013 |
| CN | 104734140 A | 6/2015 |
| CN | 204407954 U | 6/2015 |
| CN | 107947325 A | 4/2018 |
| CN | 208835762 U | 5/2019 |

(Continued)

*Primary Examiner* — Hal Kaplan
(74) *Attorney, Agent, or Firm* — Leydig, Voit & Mayer, Ltd.

(57) ABSTRACT

A power conversion apparatus includes M first slots, wherein each of M first slots is electrically connected to an input side of one of N first bus bars, and a respective first slot of the M first slots is electrically connected to a first module that can supply an alternating current or a direct current to the first bus bar electrically connected to the first slot. The apparatus further includes P second slots, wherein each of the P second slots is electrically connected between an output side of one of the N first bus bars and an input side of one of second bus bars, and a respective second slot of the P second slots is electrically connected to a second module that converts an alternating current into a direct current or that converts a direct current into a direct current.

16 Claims, 7 Drawing Sheets

(56) References Cited

FOREIGN PATENT DOCUMENTS

| | | |
|---|---|---|
| CN | 110112793 A | 8/2019 |
| EP | 3461246 A2 | 3/2019 |
| JP | 2011101526 A | 5/2011 |
| TW | M381826 U | 6/2010 |
| TW | 201913281 A | 4/2019 |
| WO | 2004075384 A2 | 9/2004 |
| WO | 2017151057 A1 | 9/2017 |

* cited by examiner

POWER CONVERSION APPARATUS AND POWER SYSTEM

CROSS-REFERENCE TO RELATED APPLICATIONS

This application is a continuation of International Application No. PCT/CN2020/075900, filed on Feb. 19, 2020, the disclosure of which is hereby incorporated by reference in its entirety.

TECHNICAL FIELD

This application relates to the field of power supply technologies, and in particular, to a power conversion apparatus and a power system.

BACKGROUND

Currently, a power system generally may supply electric energy to different power supply scenarios, and is widely used in various industries such as the electrical industry, the electric power industry, the energy industry, or the communications industry. FIG. 1 is a schematic structural diagram of a communications power system 2 in the prior art. As shown in FIG. 1, the communications power system 2 includes an alternating current distribution unit (alternating current (AC) distribution unit) 21, a rectifier unit (rectifier unit) 22, and a direct current surge protection device (direct current (DC) surge protection device, SPD) 23, a direct current distribution unit (DC distribution unit) 24, and a monitor apparatus (monitor unit) 25. The alternating current distribution unit 21 may implement an alternating current input (AC input). After a conversion process of converting an alternating current into a direct current by a rectifier in the rectifier unit 22, and protection by the direct current surge protection device 23 against surge interference, a plurality of fixed direct current outputs (DC output) can be obtained by using power distribution components such as an output shunt, a contactor, and a circuit breaker in the direct current distribution unit 24, to supply electric energy to a power supply scenario. In addition, the monitor apparatus 25 can monitor a working status of another apparatus, to ensure reliable working of the power system.

However, in the communications power system 2 in FIG. 1, the alternating current distribution unit 21 supports only an alternating current input, has a fixed single mode, and has an energy input that cannot be flexibly changed. In addition, the direct current distribution unit 24 supports only a single voltage output, and cannot flexibly adapt to a power supply scenario with a plurality of voltages and/or multi-mode voltages.

Therefore, how to design a power system that can meet various actual requirements of a power supply scenario is a problem that urgently needs to be resolved.

SUMMARY

This application provides a power conversion apparatus and a power system, to avoid a power failure risk caused by a single fixed-mode energy input, and further implement a plurality of energy outputs and/or multi-mode energy outputs, thereby meeting a multiple-input multiple-output power supply requirement.

According to a first aspect, this application provides a power conversion apparatus, including a monitor unit, M first slots, N first bus bars, P second slots, and S second bus bars, where all of M, N, P, and S are positive integers. Each of the M first slots is electrically connected to an input side of one of the N first bus bars, the first slot is configured to electrically connect to a first module, and the first module is a power module that can supply an alternating current or a direct current to the first bus bar electrically connected to the first slot. Each of the P second slots is electrically connected between an output side of one of the N first bus bars and an input side of one of the S second bus bars, the second slot is configured to electrically connect to a second module, and the second module is a module that converts an alternating current into a direct current, and/or a module that converts a direct current into a direct current. The S second bus bars are configured to supply a direct current to a downstream electric device. The monitor unit is electrically connected to all or some slots, and is configured to monitor a module electrically connected to a corresponding slot.

According to the power conversion apparatus provided in the first aspect, each of the M first slots is electrically connected to the input side of one of the N first bus bars, the first slot is configured to electrically connect to the first module, and the first module is a power module that can supply an alternating current or a direct current to the first bus bar electrically connected to the first slot, so that a plurality of energy inputs and/or multi-mode energy inputs can be provided by using the first bus bar and the first slot, to avoid a power failure risk caused by a single fixed-mode energy input. Each of the P second slots is electrically connected between the output side of one of the N first bus bars and the input side of one of the S second bus bars, the second slot is configured to electrically connect to the second module, and the second module is a module that converts an alternating current into a direct current, and/or a module that converts a direct current into a direct current, so that direct current or alternating current energy can be converted by using the second slot, to supply power to the S second bus bars, and a plurality of energy outputs can be implemented by using the S second bus bars, to provide a backup for the downstream electric device, and flexibly adapt to various power supply scenarios. The monitor unit is electrically connected to all or some slots, and is configured to monitor a module electrically connected to a corresponding slot, so that the monitor unit can monitor, in real time, the module connected by using the slot, to control/schedule the module connected by using the slot. In this way, a power system meets a multiple-input multiple-output power supply requirement by using the power conversion apparatus, to improve power supply reliability of the power system. In addition, based on a manner of an electrical connection, for example, plug-in or fixing and locking, between a module and a slot in the power conversion apparatus, an overall design of the power system is simple, and facilitates capacity expansion and maintenance.

In a possible design, each first bus bar includes:
- a dual-live-wire mode including an L1 phase wire and an L2 phase wire; or
- a three-live-wire mode including an L1 phase wire, an L2 phase wire, and an L3 phase wire; or
- a three-phase four-wire mode including an L1 phase wire, an L2 phase wire, an L3 phase wire, and an N neutral wire; or
- a three-phase five-wire mode including an L1 phase wire, an L2 phase wire, an L3 phase wire, an N neutral wire, and a PE ground cable; or
- direct current positive and direct current negative bus bars of a direct current mode. Therefore, the first bus bar has various implementation forms, to facilitate selection.

In a possible design, when a first slot corresponding to a same first bus bar is configured to be capable of electrically connecting to a plurality of first modules, and all of the plurality of first modules are alternating current modules, in the plurality of first modules, one first module supplies an alternating current to the first bus bar, the remaining first module is electrically disconnected from the first bus bar, and a working status of the remaining first module is locked; or when a first slot corresponding to a same first bus bar is configured to be capable of electrically connecting to a plurality of first modules, and all of the plurality of first modules are direct current modules, in the plurality of first modules, at least one first module supplies a direct current to the first bus bar; or when a first slot corresponding to a same first bus bar is configured to be capable of electrically connecting to a plurality of first modules, and the plurality of first modules are modules of different modes, in the plurality of first modules of different modes, one first module supplies an alternating current or a direct current to the first bus bar, the remaining first module is electrically disconnected from the first bus bar, and a working status of the remaining first module is locked.

In this application, to ensure that the first module can supply power to the power conversion apparatus, when the first module is electrically connected to the first slot, the following content is complied with: a direct current and an alternating current cannot be input to a same bus bar at the same time and two alternating currents cannot be input to a same bus bar at the same time, to avoid a short circuit caused because phases of two alternating currents are not synchronized, so that the power conversion apparatus can smoothly supply power to the downstream electric device.

In a possible design, the first module includes a direct current input module or an alternating current input module.

In a possible design, the first slot is further configured to electrically connect to a module having at least one of a direct current output function, an alternating current output function, a surge protection function, or a metering function. Therefore, reusing the first slot reduces a volume occupied by the power conversion apparatus, and meets an actual requirement for a smaller occupied volume.

In a possible design, the second module includes a DC/DC module and/or an AC/DC module.

In a possible design, the second bus bar includes direct current positive and direct current negative bus bars of a direct current mode.

In a possible design, the second slot is further configured to electrically connect to a third module and/or a fourth module, the third module is powered by a direct current on the second bus bar, and the fourth module is a power module that can supply, to the second bus bar, electric energy of another type other than electric energy supplied by the first module.

In this application, reusing the second slot not only enables the power conversion apparatus to have a plurality of energy inputs and/or multi-mode energy inputs, to improve compatibility of the power conversion apparatus with energy of different modes, but also enables the power conversion apparatus to have a plurality of energy outputs and/or energy outputs of a plurality of voltage levels, to provide a backup and input energy of a new voltage level for the downstream electric device, and flexibly adapt to various power supply scenarios. In addition, there is no need to add a new power subrack or cabinet to meet an output of a new voltage level, to reduce costs, reduce a volume occupied by the power conversion apparatus, and meet an actual requirement for a smaller occupied volume.

In a possible design, the power conversion apparatus further includes Q third slots, where Q is a positive integer. Each of the Q third slots is electrically connected to one of the S second bus bars, the third slot is configured to electrically connect to the third module and/or the fourth module, the third module is powered by the direct current on the second bus bar, and the fourth module is the power module that can supply, to the second bus bar, the electric energy of another type other than the electric energy supplied by the first module.

In this application, reusing the third slot not only enables the power conversion apparatus to have a plurality of energy inputs and/or multi-mode energy inputs, to improve compatibility of the power conversion apparatus with energy of different modes, but also enables the power conversion apparatus to have a plurality of energy outputs and/or energy outputs of a plurality of voltage levels, to provide a backup and input energy of a new voltage level for the downstream electric device, and flexibly adapt to various power supply scenarios. In addition, there is no need to add a new power subrack or cabinet to meet an output of a new voltage level, to reduce costs, reduce a volume occupied by the power conversion apparatus, and meet an actual requirement for a smaller occupied volume.

In a possible design, the third module includes any one of a direct current output power distribution module, a surge protection power distribution module, a DC/AC module, a boost DC/DC module, a buck DC/DC module, a voltage-regulated DC/DC module, a buck-boost DC/DC module, or a DC/DC and DC/AC multi-output module.

In a possible design, the fourth module includes any one of a solar input module, a wind energy input module, an energy storage module, a battery management module, or a third-party energy management module.

In a possible design, when the fourth module includes any one of the energy storage module, the battery management module, or the third-party energy management module, the fourth module is electrically connected to a corresponding slot in a plug-in manner or a copper/aluminum busbar locking manner. Therefore, a plurality of possibilities are provided for an electrical connection between the fourth module and the corresponding slot.

In conclusion, on one hand, the power conversion apparatus in this application not only can be connected, through the electrical connection between the first slot and the first module, to a power source provided by the first module, but also can be connected, through the electrical connection between the second slot and the fourth module and/or between the third slot and the fourth module, to another type of energy other than the electric energy supplied by the first module, so that the power conversion apparatus has a plurality of energy inputs and/or multi-mode energy inputs and/or multi-type energy inputs. On the other hand, the power conversion apparatus in this application can adapt, through the electrical connection between the second slot and the fourth module and/or between the third slot and the fourth module, the direct current on the second bus bar for voltages for various power supply scenarios, so that the power conversion apparatus can supply a plurality of paths of energy and/or energy of a plurality of voltage levels to the downstream electric device. In this way, the power conversion apparatus can supply, by using the third module, power to downstream electric devices having various power supply requirements, to meet actual requirements in various power supply scenarios.

In a possible design, the monitor unit includes a main control module. The main control module is electrically connected to all or some slots, and is configured to monitor a module electrically connected to a corresponding slot.

In this application, the main control module can monitor the module electrically connected to the corresponding slot, to control/schedule the module electrically connected to each slot, so that the power conversion apparatus can smoothly supply power. In this way, the power conversion apparatus in this application can supply power by monitoring the modules by using the main control module, to reduce costs and simplify a design.

In a possible design, the monitor unit further includes a wireless network access module. The wireless network access module is electrically connected to the slot electrically connected to the second bus bar, or the wireless network access module is electrically connected to the main control module. The wireless network access module is configured to separately communicate with the main control module and an upper-layer network management device in a wireless manner. The main control module is further configured to monitor the upper-layer network management device by using the wireless network access module.

In this application, the upper-layer network management device can monitor a working status of the power conversion apparatus in real time by using the wireless network access module, learn a power supply status of the power conversion apparatus in time, and adjust the power conversion apparatus in time. Further, the main control module may respond to an instruction of the upper-layer network management device by using the wireless network access module, and perform a corresponding operation on a corresponding module, so that the power conversion apparatus adapts to various power supply scenarios.

In a possible design, the monitor unit further includes a user interface module. The user interface module is electrically connected to the slot electrically connected to the second bus bar, or the user interface module is electrically connected to the main control module. The user interface module is configured to monitor a lower-layer device through a dry contact interface, an analog parameter interface, or at least one manner in a software protocol. The main control module is further configured to monitor the lower-layer device by using the user interface module.

In this application, the user interface module may be configured to monitor the lower-layer device by using the dry contact interface, the analog parameter interface, or the software protocol. In addition, the user interface module may send, to the main control module through the electrical connection to the main control module, a signal used to indicate a working status of the lower-layer device, so that the main control module can monitor the working status of the lower-layer device in real time by using the user interface module, to monitor a power supply environment of the power conversion apparatus in real time, and ensure that the power conversion apparatus can smoothly supply power to the downstream electric device.

According to a second aspect, this application provides a power system, including a power supply module and the power conversion apparatus according to any one of the first aspect and the possible designs of the first aspect, where the power supply module includes a direct current power module and/or an alternating current power module.

LIST OF REFERENCE NUMERALS

Figure 1:
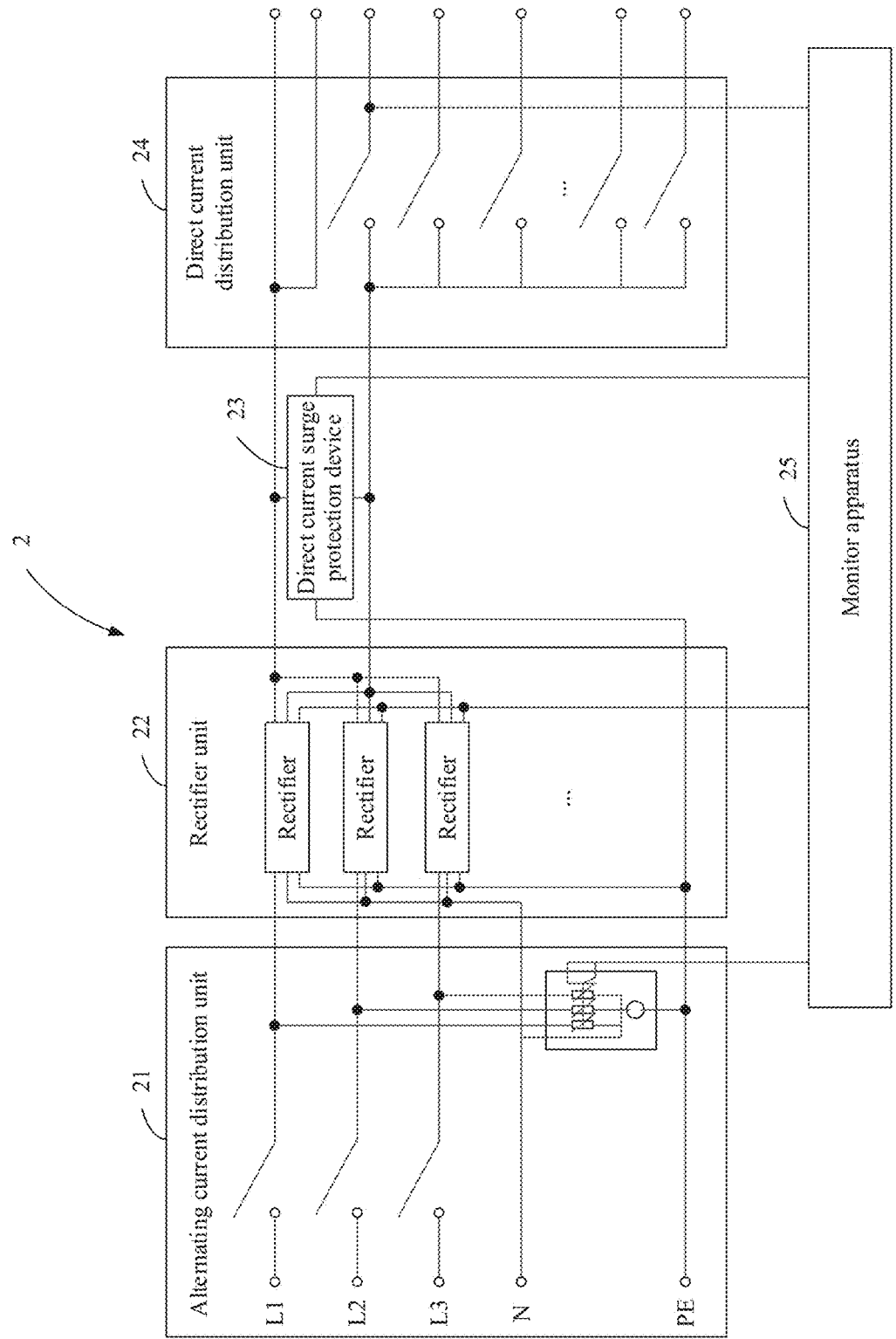
FIG. 1 is a schematic structural diagram of a communications power system in the prior art.

1. Power system; 20. power supply module; 10. power conversion apparatus; 11. first slot; 12. first bus bar; 13. second slot; 14. second bus bar; 15. third slot; 16. monitor unit; 161. main control module; 162. wireless network access module; and 163. user interface module; and 2. Communications power system; 21. alternating current distribution unit; 22. rectifier unit; 23. direct current surge protection device; 24. direct current distribution unit; and 25. monitor apparatus.

DESCRIPTION OF EMBODIMENTS

In this application, the term "at least one" means one or more, and the term "a plurality of" means two or more. The term "and/or" describes an association relationship between associated objects and represents that three relationships may exist. For example, A and/or B may represent the following three cases: Only A exists, both A and B exist, and only B exists, where both A and B may be in a singular form or a plural form. The character "/" usually indicates an "or" relationship between the associated objects. "At least one of the following" or a similar expression means any combination of the items, including a single item or any combination of a plurality of items. For example, at least one of a, b, or c may represent: a, b, c, a combination of a and b, a combination of a and c, a combination of b and c, or a combination of a, b and c, where each of a, b, and c may be in a singular form or a plural form. In addition, the terms "first" and "second" are merely used for a purpose of description, and cannot be understood as indicating or implying relative importance.

This application provides a power conversion apparatus and a power system that are applicable to various industries such as the electrical industry, the electric power industry, the energy industry, or the communications industry. Based on layouts of bus bars and slots, modules electrically connected to the slots are monitored for controlling or scheduling by using one monitor unit, so that a plurality of energy inputs and/or multi-mode energy inputs can be implemented, to avoid a power failure risk caused by a single fixed-mode energy input, and a plurality of energy outputs and/or multi-mode energy outputs can be implemented, to supply backup input energy to a downstream electric device, and flexibly adapt to various power supply scenarios. In addition, there is no need to add a new power subrack or cabinet to meet an output of a new voltage level, to reduce costs. In this way, the power system meets a multiple-input multiple-output power supply requirement by using the power conversion apparatus, to improve power supply reliability of the power system. In addition, based on a manner of an electrical connection, for example, plug-in or fixing and locking, between a module and a slot in the power conversion apparatus, an overall design of the power system is simple, and facilitates capacity expansion and maintenance.

In this application, a plurality of paths of energy may be understood as a plurality of same voltages and/or a plurality of different voltages.

Figure 2:
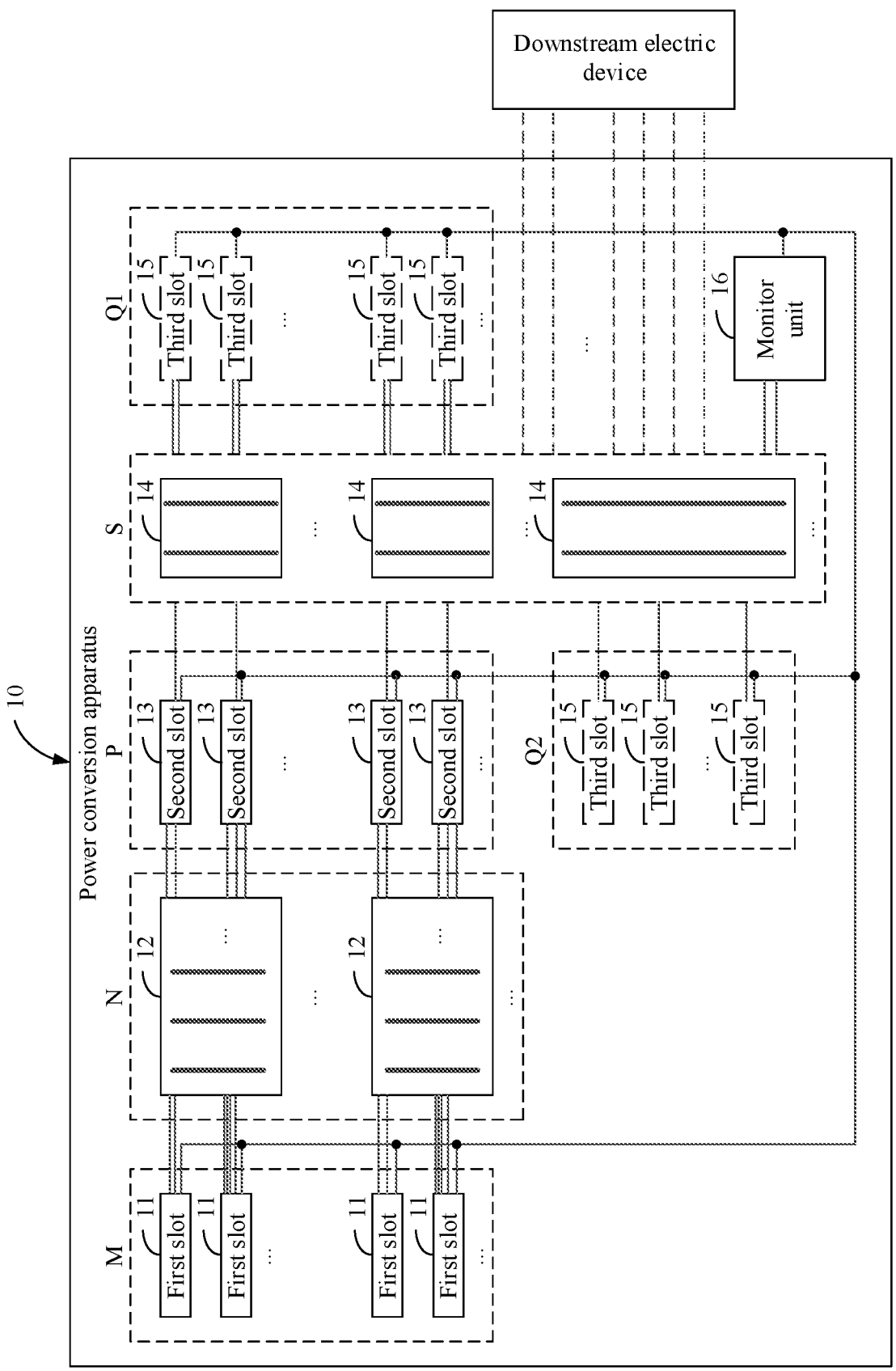
FIG. 2 is a schematic structural diagram of a power conversion apparatus according to an embodiment of this application.

The following describes in detail a specific structure of the power conversion apparatus in this application with reference to FIG. 2.

FIG. 2 is a schematic structural diagram of a power conversion apparatus according to an embodiment of this application. As shown in FIG. 2, the power conversion apparatus 10 in this application may include a monitor unit 16, M first slots 11, N first bus bars 12, P second slots 13, and S second bus bars 14. All of M, N, P, and S are positive integers.

In this application, the N first bus bars 12 are disposed in the power conversion apparatus 10. A specific implementation form of the N first bus bars 12 is not limited in this application.

Optionally, each first bus bar 12 may include:
a dual-live-wire mode including an L1 phase wire and an L2 phase wire; or
a three-live-wire mode including an L1 phase wire, an L2 phase wire, and an L3 phase wire; or
a three-phase four-wire mode including an L1 phase wire, an L2 phase wire, an L3 phase wire, and an N neutral wire; or
a three-phase five-wire mode including an L1 phase wire, an L2 phase wire, an L3 phase wire, an N neutral wire, and a PE ground cable; or
direct current positive and direct current negative bus bars of a direct current mode. Herein, the direct current positive and the direct current negative refer to relative values of amplitudes of voltages on their respective wires. For example, an amplitude of a ground voltage on the wire corresponding to the direct current positive generally is greater than an amplitude of a voltage on the wire corresponding to the direct current negative, and the ground voltage on the wire corresponding to the direct current positive/the ground voltage on the wire corresponding to the direct current negative may be positive voltages, or may be negative voltages. This is not limited in this application.

In this application, during working, one or more of the N first bus bars 12 can supply a direct current or an alternating current at the same time. For example, all of the N first bus bars 12 may be set to bus bars of an alternating current mode, or all of the N first bus bars 12 may be set to bus bars of the direct current mode, or some of the N first bus bars 12 are set to bus bars of an alternating current mode, and the remaining first bus bar 12 is set to a bus bar of the direct current mode.

It should be noted that in the N first bus bars 12, when some first bus bars 12 are bus bars of the alternating current mode, and the remaining first bus bar 12 is a bus bar of the direct current mode, in this application, it needs to be ensured that a first module electrically connected to a first slot 11 does not supply an alternating current and a direct current to the first bus bar 12 at the same time.

In this application, each of the M first slots 11 is electrically connected to an input side of one of the N first bus bars 12. Generally, when N=1, there is one first bus bar 12, and all of the M first slots 11 are electrically connected to an input side of the first bus bar 12. When N>1, there are a plurality of first bus bars 12, and any one of the M first slots 11 may be electrically connected to an input side of any one of the plurality of first bus bars 12. In other words, one first slot 11 is electrically connected to one first bus bar 12, and different first bus bars 12 are electrically connected to different first slots 11.

In this application, a quantity of first slots 11 electrically connected to an input side of each first bus bar 12 may be set with reference to actual disposing space of the slot and a power supply requirement. This is not limited in this application.

In this application, the first slot 11 is configured to electrically connect to the first module, and the first module is a power module that can supply an alternating current or a direct current to the first bus bar 12 electrically connected to the first slot 11. Any first slot 11 may be electrically connected only to a first module that supplies an alternating current, or may be electrically connected only to a first module that supplies a direct current, or may be electrically connected to a first module that supplies both an alternating current and a direct current, and the first module supplies only the alternating current or the direct current when being electrically connected to the first slot 11. This is not limited in this application.

Therefore, disposing the M first slots 11 adds an electric energy mode for supplying power to the power conversion apparatus 10, so that the power conversion apparatus 10 is applicable to a plurality of energy inputs and/or multi-mode energy inputs at the same time.

A specific implementation of the first module is not limited in this application. Optionally, the first module may include a direct current input module or an alternating current input module. For example, the direct current input module may include a direct current such as 240 volts direct-current (Vlots Direct-Current, VDC) or 336 VDC. The alternating current input module may include a mains supply, a diesel generator, or the like. In addition, a supply voltage of the first module is not limited in this application. It should be noted that the first module may be alternatively a direct current and alternating current hybrid input module, and the hybrid input module supplies only an alternating current or a direct current when being electrically connected to the first slot 11. In addition, a specific source of the first module is not limited in this application. Generally, the first module is mainly powered by power grid electric energy, and certainly may be alternatively powered by off-grid electric energy (for example, energy of another type such as solar energy or wind energy).

In this application, a manner of the electrical connection between the first slot 11 and the first bus bar 12 may be set based on a manner of an actual connection between the first module and the first bus bar 12. For ease of description, the manner of the electrical connection between the first slot 11 and the first bus bar 12 is described by using an example in which the first bus bar 12 is of a three-phase four-wire mode including an L1 phase wire, an L2 phase wire, an L3 phase wire, and an N neutral wire.

When the first module electrically connected to the first slot 11 is a direct current input module, because a first output end of the direct current input module generally is electrically connected to all of the L1 phase wire, the L2 phase wire, and the L3 phase wire in the first bus bar 12, one end of the first slot 11 is electrically connected to all of the L1 phase wire, the L2 phase wire, and the L3 phase wire in the first bus bar 12, so that the first output end of the direct current input module can be electrically connected to all of the L1 phase wire, the L2 phase wire, and the L3 phase wire in the first bus bar 12 by using the first slot 11. Because a second output end of the direct current input module generally is electrically connected to the N neutral wire in the first bus bar 12, another end of the first slot 11 is electrically connected to the N neutral wire in the first bus bar 12, so that the second output end of the direct current input module is electrically connected to the N neutral wire in the first bus bar 12 by using the first slot 11.

When the first module electrically connected to the first slot 11 is an alternating current input module, because an L1 phase wire of the alternating current input module generally is electrically connected to the L1 phase wire in the first bus bar 12, a first end of the first slot 11 is electrically connected to the L1 phase wire in the first bus bar 12, so that the L1 phase wire of the alternating current input module is electrically connected to the L1 phase wire in the first bus bar 12 by using the first slot 11. Because an L2 phase wire of the alternating current input module generally is electrically connected to the L2 phase wire in the first bus bar 12, a second end of the first slot 11 is electrically connected to the L2 phase wire in the first bus bar 12, so that the L2 phase wire of the alternating current input module is electrically connected to the L2 phase wire in the first bus bar 12 by using the first slot 11. Because an L3 phase wire of the alternating current input module generally is electrically connected to the L3 phase wire in the first bus bar 12, a third end of the first slot 11 is electrically connected to the L3 phase wire in the first bus bar 12, so that the L3 phase wire of the alternating current input module is electrically connected to the L3 phase wire in the first bus bar 12 by using the first slot 11. Because an N neutral wire of the alternating current input module generally is electrically connected to the N neutral wire in the first bus bar 12, a fourth end of the first slot 11 is electrically connected to the N neutral wire in the first bus bar 12, so that the N neutral wire of the alternating current input module is electrically connected to the N neutral wire in the first bus bar 12 by using the first slot 11.

In this application, disposing the N first bus bars 12 not only enables the power conversion apparatus 10 to implement alternating current power supply by configuring different first modules, but also enables the power conversion apparatus 10 to implement one or more paths of direct current power supply by configuring different first modules, to resolve a problem in a conventional technology that a power input mode cannot be flexibly configured and different power supply scenarios cannot be met due to a fixed configuration. In addition, each first bus bar 12 may be powered by one or more first modules of the direct current mode, so that a range of power modes on the first bus bar 12 is wide, and the power conversion apparatus 10 meets more power supply scenarios.

In this application, the S second bus bars 14 may be further disposed in the power conversion apparatus 10, and S is a positive integer. A specific implementation form of the S second bus bars 14 is not limited in this application. Optionally, the S second bus bars 14 may include direct current positive and direct current negative bus bars of the direct current mode. The direct current positive and the direct current negative herein are the same as those described above, and details are not described herein again. In addition, voltage ranges of the S second bus bars 14 are not limited in this application. Generally, the voltage ranges of the S second bus bars 14 may be between DC 36 V and DC 72 V.

It should be noted that to approach an actual power supply requirement, when both the first bus bar 12 and the second bus bar 14 are bus bars of the direct current, a voltage on the first bus bar 12 may be different from a voltage on the second bus bar 14, to meet power supply requirements of different output voltages.

In this application, each of the P second slots 13 is electrically connected between an output side of one of the N first bus bars 12 and an input side of one of the second bus bars 14. Generally, when N=1 and S=1, there is one first bus bar 12, there is one second bus bar 14, and all of the P second slots 13 are electrically connected between an output side of the first bus bar 12 and an input side of the second bus bar 14.

When N=1 and S>1, there is one first bus bar 12, there are a plurality of second bus bars 14, and all of the P second slots 13 are electrically connected between an output side of the first bus bar 12 and an input side of any one of the second bus bars 14. In other words, one second slot 13 is electrically connected to one second bus bar 14, and different second bus bars 14 are electrically connected to different second slots 13.

When N>1 and S=1, there are a plurality of first bus bars 12, there is one second bus bar 14, and any one of the P second slots 13 may be electrically connected between an output side of any one of the plurality of first bus bars 12 and an input side of the second bus bar 14. In other words, one second slot 13 is electrically connected to one first bus bar 12, and different first bus bars 12 are electrically connected to different second slots 13.

When N>1 and S>1, there are a plurality of first bus bars 12, there are a plurality of second bus bars 14, and any one of the P second slots 13 may be electrically connected between an output side of any one of the plurality of first bus bars 12 and an input side of any one of the plurality of second bus bars 14. In other words, one second slot 13 is separately electrically connected to one first bus bar 12 and one second bus bar 14, different first bus bars 12 are electrically connected to different second slots 13, and different second bus bars 14 are electrically connected to different second slots 13.

In this application, a quantity of second slots 13 that are electrically connected between the first bus bar 12 and the second bus bar 14 may be set with reference to actual disposing space of the slot and a power supply requirement. This is not limited in this application.

In this application, the second slot 13 is configured to electrically connect to a second module, and the second module may be a module that converts an alternating current into a direct current, or the second module may be a module that converts a direct current into a direct current; or the second module may be a module that converts an alternating current into a direct current and converts a direct current into a direct current, for example, a module integrated with a function of converting an alternating current into a direct current and a function of converting a direct current into a direct current.

Any second slot 13 may be electrically connected only to a second module that converts an alternating current into a direct current, or may be electrically connected only to a second module that converts a direct current into an alternating current, or may be electrically connected to a second module that converts an alternating current into a direct current and converts a direct current into a direct current.

Therefore, disposing the P second slots 13 enables the power conversion apparatus 10 to convert a plurality of paths of input energy and/or multi-mode input energy and/or multi-type input energy into direct current electric energy, to facilitate transmission to the S second bus bars 14.

A specific implementation form of the second module is not limited in this application. Optionally, the second module may include a DC/DC (Direct Current to Direct Current) module, an AC/DC module (for example, a rectifier (Rectifier)), or a DC/DC module and an AC/DC module.

It should be noted that to approach an actual power supply requirement, when the second module includes a DC/DC module, the second module generally converts a voltage on the first bus bar 12 into a different voltage, to meet power supply requirements of different output voltages.

In this application, a manner of a connection between a port of the second slot 13 close to the first bus bar 12 and the first bus bar 12 may be set based on a manner of an actual connection between the second module and the first bus bar 12. For ease of description, the manner of the connection between the second slot 13 and the first bus bar 12 is described by using an example in which the first bus bar 12 is of a three-phase five-wire mode including an L1 phase wire, an L2 phase wire, an L3 phase wire, an N neutral wire, and a PE ground cable.

Because a first end of the second module generally may be electrically connected to any one of the L1 phase wire, the L2 phase wire, and the L3 phase wire in the first bus bar 12, a first end of the second slot 13 is electrically connected to any one of the L1 phase wire, the L2 phase wire, and the L3 phase wire in the first bus bar 12, so that the second module is electrically connected to any one of the L1 phase wire, the L2 phase wire, and the L3 phase wire in the first bus bar 12 by using the second slot 13. Because a second end of the second module generally is electrically connected to the N neutral wire in the first bus bar 12, a second end of the second slot 13 is electrically connected to the N neutral wire in the first bus bar 12, so that the second module is electrically connected to the N neutral wire in the first bus bar 12 by using the first slot 11. Because a ground terminal of the second module generally is electrically connected to the PE ground cable in the first bus bar 12, a third end of the second slot 13 is electrically connected to the PE ground cable in the first bus bar 12, so that the second module is electrically connected to the PE ground cable in the first bus bar 12 by using the second slot 13.

In this application, a manner of a connection between a port of the second slot 13 close to the second bus bar 14 and the second bus bar 14 may be set based on a manner of an actual connection between the second module and the second bus bar 14. Because a quantity of wires in the second bus bar 14 is fixed, and usually is 2, in this application, the following setting may be made: a fourth end of the second slot 13 is electrically connected to one wire in the second bus bar 14, and a fifth end of the second slot 13 is electrically connected to the other wire in the second bus bar 14, so that the second module is electrically connected to the second bus bar 14 by using the second slot 13.

In this application, the power conversion apparatus 10 may use direct currents on the S second bus bars 14 as a power source of downstream user equipment, to facilitate energy obtaining. Therefore, disposing the S second bus bars 14 enables the power conversion apparatus 10 to implement direct current power supply of a plurality of different voltages, to resolve a problem in a conventional technology that only a single-voltage output is supported. Therefore, the power conversion apparatus 10 can flexibly adapt to power supply scenarios of a plurality of voltages.

A specific implementation form of the downstream electric device is not limited in this application. For example, the downstream electric device includes an alternating current/direct current air conditioner, a lamp, a maintenance socket, an information and communications technology (ICT) device with a voltage such as −48 V, or the like. The ICT device may include a radio remote unit (RRU), a baseband processing unit (BBU), a radio frequency and antenna unit (AAU), a router, a switch, a storage device, or the like. In addition, the downstream electric device may further include: a smart sensor with a voltage such as 12 V or 24 V, a snapshot device needing an alternating current power supply, a high-voltage direct current device needing a remote power supply, or the like In this application, the monitor unit 16 may be electrically connected to all slots (namely, the M first slots 11 and the P second slots 13) in the power conversion apparatus 10, or may be electrically connected to some slots (namely, one or more of the M first slots 11 and the P second slots 13) in the power conversion apparatus 10. Generally, the monitor unit 16 may be electrically connected to all of the P second slots 13.

Therefore, the monitor unit 16 can monitor a module electrically connected to a corresponding slot, to control/schedule the module electrically connected to each slot, to smoothly implement a power supply process of the power conversion apparatus 10. In this way, the power conversion apparatus 10 in this application can supply power by monitoring the module by using one monitor unit 16 (similar to a "brain"), to reduce costs and simplify a design.

A specific implementation form of the monitor unit 16 is not limited in this application. In addition, a manner of an electrical connection between the monitor unit 16 and any slot is not limited in this application. For example, to reduce a quantity of ports of the monitor unit 16, the monitor unit 16 may be electrically connected to all of the slots by using one port. In addition, the monitor unit 16 may be further electrically connected to the second bus bar 14, so that energy on the second bus bar 14 can be used as a power source of the monitor unit 16, to enable the monitor unit 16 to work.

It should be noted that the module electrically connected to the monitor unit 16 may determine, by using a pin definition, a dry contact interface (or hardware address allocation, for example, slots are distinguished between by using a voltage value corresponding to a resistor), a software protocol, or the like, information about a slot that is electrically connected to the module. The information may be represented by using information such as a model, a sequence number, or address information of the slot, and this is not limited in this application. In this way, the module electrically connected to the monitor unit 16 may report the information about the slot to the monitor unit 16, so that the monitor unit 16 controls/schedules the module based on the information.

Figure 3:
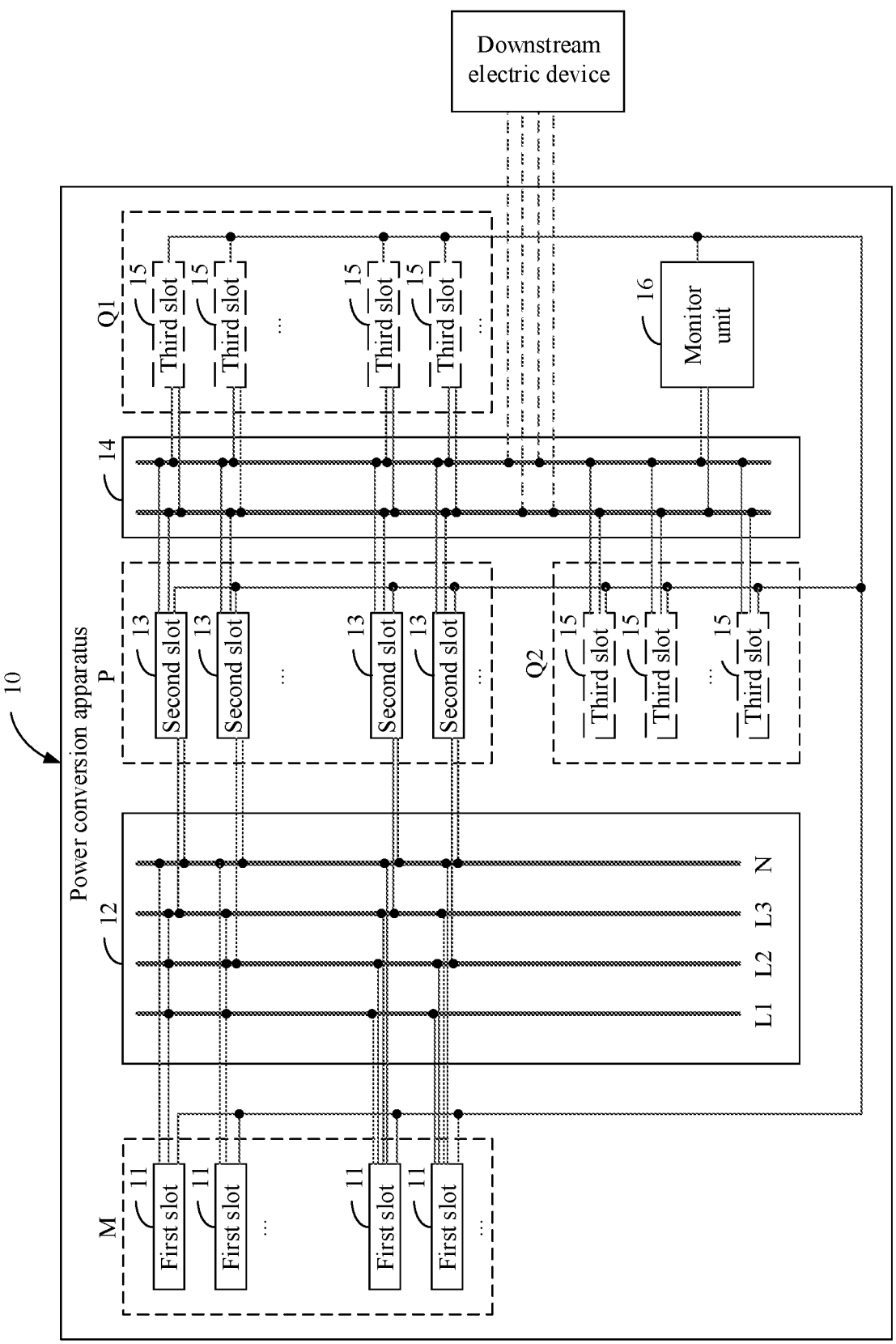
FIG. 3 is a schematic structural diagram of a power conversion apparatus according to another embodiment of this application.
Figure 4:
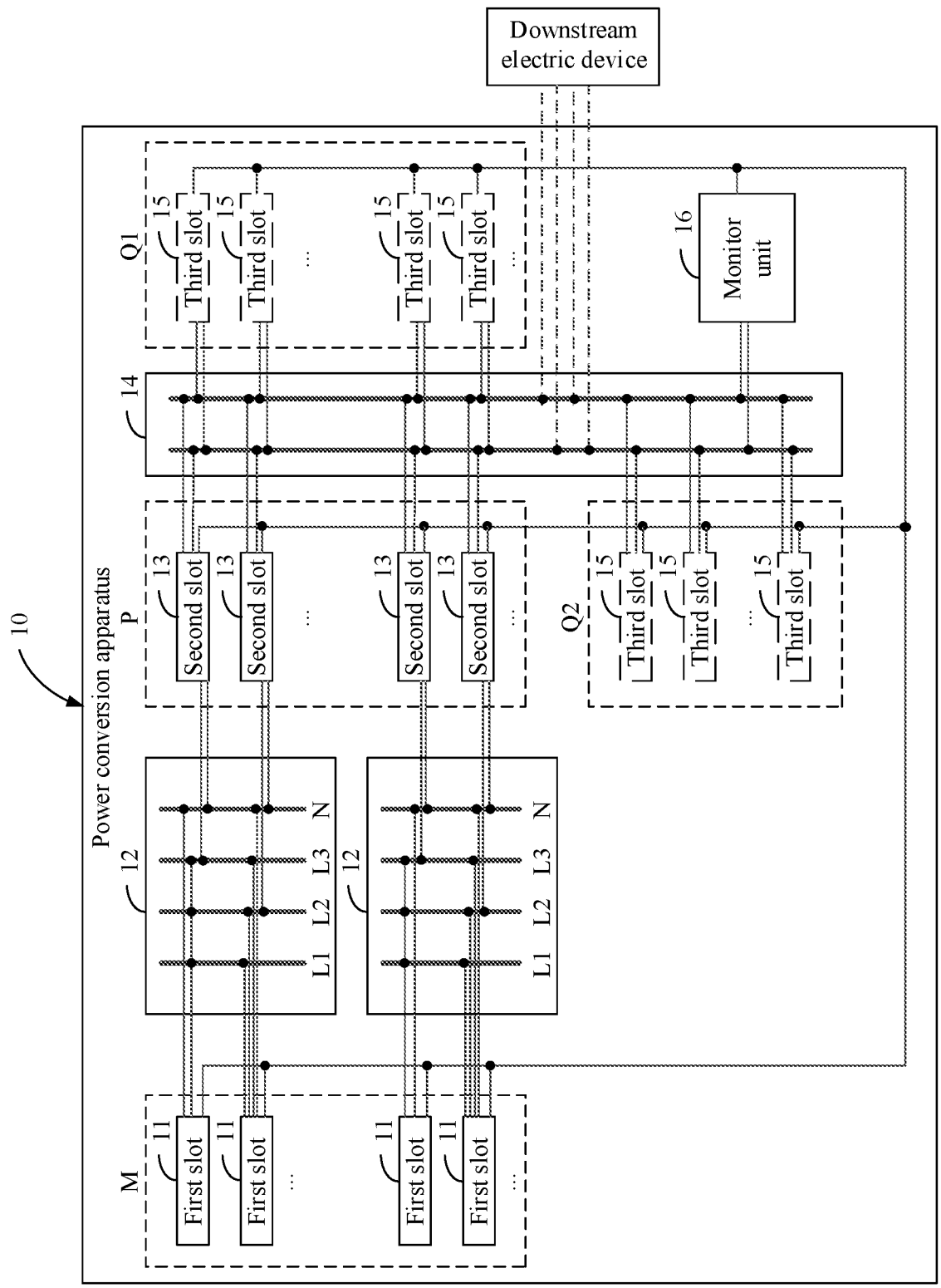
FIG. 4 is a schematic structural diagram of a power conversion apparatus according to still another embodiment of this application.

Based on the embodiment shown in FIG. 2, a specific structure of the power conversion apparatus 10 in this application is further described with reference to FIG. 3 and FIG. 4. For ease of description, in FIG. 3, illustration is provided by using an example in which there is one first bus bar 12 and one second bus bar 14 in the power system 1. In FIG. 4, illustration is provided by using an example in which there are two first bus bars 12 and one second bus bar 14 in the power system 1. In addition, in FIG. 3 and FIG. 4, illustration is provided by using an example in which the first bus bar 12 is of a three-phase four-wire mode including an L1 phase wire, an L2 phase wire, an L3 phase wire, and an N neutral wire.

As shown in FIG. 3, in the M first slots 11, some first slots 11 are configured to electrically connect to a first module of a direct current mode, one end of each first slot 11 is electrically connected to all of the L1 phase wire, the L2 phase wire, and the L3 phase wire in the first bus bar 12, and another end of each first slot 11 is electrically connected to the N neutral wire in the first bus bar 12. The remaining first slot 11 is configured to electrically connect to a first module of an alternating current mode, a first end of each first slot 11 is electrically connected to the L1 phase wire in the first bus bar 12, a second end of each first slot 11 is electrically connected to the L2 phase wire in the first bus bar 12, a third end of each first slot 11 is electrically connected to the L3 phase wire in the first bus bar 12, and a fourth end of each first slot 11 is electrically connected to the N neutral wire in the first bus bar 12.

The P second slots 13 are configured to electrically connect to a second module that converts an alternating current into a direct current and/or converts a direct current into a direct current. In ports on sides of the P second slots 13 close to the first bus bar 12, one end of each second slot 13 is electrically connected to any one of the L1 phase wire, the L2 phase wire, and the L3 phase wire in the first bus bar 12, and another end of the second slot 13 is grounded. In ports on sides of the P second slots 13 close to the second bus bar 14, one end of each second slot 13 is electrically connected to one wire in the second bus bar 14, and another end of each second slot 13 is electrically connected to another wire in the second bus bar 14.

As shown in FIG. 4, in the M first slots 11, some first slots 11 are electrically connected to one first bus bar 12, and the remaining first slot 11 is electrically connected to the other first bus bar 12. In a first slot electrically connected to each first bus bar 12, when the first slot 11 is configured to electrically connect to a first module of a direct current mode, one end of the first slot 11 is electrically connected to the L1 phase wire, the L2 phase wire, and the L3 phase wire in the first bus bar 12, and another end of the first slot 11 is electrically connected to the N neutral wire in the first bus bar 12. When the first slot 11 is configured to electrically connect to a first module of an alternating current mode, a first end of the first slot 11 is electrically connected to the L1 phase wire in the first bus bar 12, a second end of the first slot 11 is electrically connected to the L2 phase wire in the first bus bar 12, a third end of the first slot 11 is electrically connected to the L3 phase wire in the first bus bar 12, and a fourth end of the first slot 11 is electrically connected to the N neutral wire in the first bus bar 12.

The P second slots 13 are configured to electrically connect to a second module that converts an alternating current into a direct current and/or converts a direct current into a direct current. In the P second slots 13, some second slots 13 are electrically connected between one first bus bar 12 and the second bus bar 14, and the remaining second slot 13 is electrically connected between the other first bus bar 12 and the second bus bar 14. In the P second slots 13, when the second slot 13 is a slot supporting a single-phase input module, a first end of each second slot 13 is electrically connected to any one of the L1 phase wire, the L2 phase wire, and the L3 phase wire in the first bus bar 12, a second end of each second slot 13 is electrically connected to the N neutral wire in the first bus bar 12, and a third end of each second slot 13 is grounded. In ports on sides of the P second slots 13 close to the second bus bar 14, a fourth end of each second slot 13 is electrically connected to one wire in the second bus bar 14, and a fifth end of each second slot 13 is electrically connected to another wire in the second bus bar 14. When the second slot 13 supports an input of an alternating current three-phase input module, a first end of each second slot 13 includes three interfaces that are respectively electrically connected to the L1 phase wire, the L2 phase wire, and the L3 phase wire in the first bus bar 12.

As shown in FIG. 3 and FIG. 4, in the M first slots 11 and the P second slots 13, one end newly disposed in each slot is electrically connected to a same end of the monitor unit 16, so that the monitor unit 16 can control/schedule a module electrically connected to each slot. In addition, the monitor unit 16 is further electrically connected to two wires in the second bus bar 14, so that the monitor unit 16 can obtain, by using the second bus bar 14, a power source that can enable the monitor unit 16 to work.

Further, the power conversion apparatus 10 in this application can supply, by using the second slot 13, electric energy of a plurality of voltage outputs to the downstream electric device. For example, the downstream electric device may obtain needed electric energy from an output end of any one or more second slots 13 by using a module such as a circuit breaker. For ease of description, in FIG. 3 and FIG. 4, two pairs of dashed lines between the second bus bar 14 and the downstream electric device are used as an example to illustrate an electrical connection between the second bus bar 14 and the downstream electric device.

Therefore, in the power conversion apparatus 10 in this application, based on a modular design of a slot and a bus bar, and based on an electrical connection between a slot and a module, the bus bar can adapt to voltage inputs of different modes and/or a plurality of voltage inputs, to connect to energy of various modes and/or a plurality of paths of energy, and voltage outputs of a plurality of voltages can be further supplied to the downstream electric device by using an output end of the slot, to meet a multiple-input multiple-output power supply requirement.

It should be noted that in this application, a manner of an electrical connection between a slot and a module may include but is not limited to a plug-in manner and a fixing and locking manner.

According to the power conversion apparatus provided in this application, each of the M first slots is electrically connected to the input side of one of the N first bus bars, the first slot is configured to electrically connect to the first module, and the first module is a power module that can supply an alternating current or a direct current to the first bus bar electrically connected to the first slot, so that a plurality of energy inputs and/or multi-mode energy inputs can be supplied by using the first bus bar and the first slot, to avoid a power failure risk caused by a single fixed-mode energy input. Each of the P second slots is electrically connected between the output side of one of the N first bus bars and the input side of one of the S second bus bars, the second slot is configured to electrically connect to the second module, and the second module is a module that converts an alternating current into a direct current and/or a module that converts a direct current into a direct current, so that direct current or alternating current energy can be converted by using the second slot, to supply power to the S second bus bars, and a plurality of energy outputs can be implemented by using the S second bus bars, to provide a backup for the downstream electric device, and flexibly adapt to various power supply scenarios. The monitor unit is electrically connected to all or some slots, and is configured to monitor a module electrically connected to a corresponding slot, so that the monitor unit can monitor, in real time, the module connected by using the slot, to control/schedule the module connected by using the slot. In this way, the power system meets a multiple-input multiple-output power supply requirement by using the power conversion apparatus, to improve power supply reliability of the power system. In addition, based on the manner of the electrical connection, for example, plug-in or fixing and locking, between the module and the slot in the power conversion apparatus, an overall design of the power system is simple, and facilitates capacity expansion and maintenance.

The following describes in detail a specific structure of the power conversion apparatus 10 in this application with reference to several specific embodiments.

In this application, the first slot 11 may be further set to a slot that can be reused. Based on this, the first slot 11 may be further electrically connected to a module having at least one of a direct current output function, an alternating current output function, a surge protection (Surge Protection Device, SPD) function, or a metering function. The direct current output function is used to output direct current electric energy by using direct current electric energy on the first bus bar 12. The alternating current output function is used to output alternating current electric energy by using alternating current electric energy on the first bus bar 12. The surge protection function is used to implement surge protection. The metering function is used to meter electric energy on the first bus bar 12 for subsequent operations.

For example, the module may be a module having the direct current output function, or may be a module having the direct current output function and the surge protection function, or may be a module having the direct current output function, the surge protection function, and the metering function. For another example, the module may be a module having the alternating current output function, or may be a module having the alternating current output function and the surge protection function, or may be a module having the alternating current output function, the surge protection function, and the metering function.

It should be noted that in addition to including the direct current input function or the alternating current input function, the first module may further integrate at least one of the foregoing functions. For example, the first module may be a module having the direct current input function, or may be a module having the direct current input function and the surge protection function, or may be a module having the direct current input function, the surge protection function, and the metering function. For another example, the first module may be a module having the alternating current input function, or may be a module having the alternating current input function and the surge protection function, or may be a module having the alternating current input function, the surge protection function, and the metering function.

Therefore, reusing the first slot 11 reduces a volume occupied by the power conversion apparatus 10, and meets an actual requirement for a smaller occupied volume.

A person skilled in the art may understand that a direct current and an alternating current cannot be input to a same bus bar at the same time, and a short circuit easily occurs because phases of two alternating currents input to a same bus bar are not synchronized. In this application, to ensure that the first module can supply power to the power conversion apparatus 10, the foregoing content needs to be complied with when the first module is electrically connected to the first slot 11, so that the power conversion apparatus 10 can smoothly supply energy to the downstream electric device.

The following describes a specific working status of the first module electrically connected to the first slot 11.

When a first slot 11 corresponding to a same first bus bar 12 is configured to electrically connect to a plurality of first modules, and all of the plurality of first modules are alternating current modules, in the plurality of first modules, one first module may supply an alternating current to the first bus bar 12, and the remaining first module is electrically disconnected from the first bus bar 12, so that the first bus bar 12 does not have a direct current electric energy input and/or alternating current inputs whose phases are not synchronized, and a working status of the remaining first module is locked, to prevent a case in which due to a misoperation of an operator, the first bus bar 12 has a direct current input and/or alternating current inputs whose phases are not synchronized.

When a first slot 11 corresponding to a same first bus bar 12 is configured to electrically connect a plurality of first modules, and the plurality of first modules are direct current modules, in the plurality of first modules, at least one first module may supply a direct current to the first bus bar 12. Generally, a first module with a relatively high voltage amplitude may supply a direct current to the first bus bar 12. In addition, when the plurality of first modules do not include a reverse current protection circuit, in the plurality of first modules, one first module may supply a direct current to the first bus bar 12, and the remaining first module may be electrically disconnected from the first bus bar 12, so that the first bus bar 12 does not have a direct current electric energy input and/or alternating current inputs whose phases are not synchronized, and a working status of the remaining first module is locked, to prevent a case in which due to a misoperation of an operator, the first bus bar 12 has a direct current input and/or alternating current inputs whose phases are not synchronized.

When a first slot 11 corresponding to a same first bus bar 12 is configured to electrically connect to a plurality of first modules, and all of the plurality of first modules are modules of different modes (that is, the plurality of first modules include both a first module of an alternating current mode and a first module of a direct current mode), in the plurality of first modules, one first module of the alternating current mode may supply an alternating current to the first bus bar 12, and the remaining first module is electrically disconnected from the first bus bar 12, so that the first bus bar 12 does not have a direct current electric energy input and/or alternating current inputs whose phases are not synchronized, and a working status of the remaining first module is locked, to prevent a case in which due to a misoperation of an operator, the first bus bar 12 has a direct current input and/or alternating current inputs whose phases are not synchronized. Alternatively, in the plurality of first modules, at least one first module of the direct current mode may supply a direct current to the first bus bar 12, and the remaining first module is electrically disconnected from the first bus bar, so that the first bus bar 12 does not have a direct current electric energy input and/or alternating current inputs whose phases are not synchronized, and a working status of the remaining first module is locked, to prevent a case in which due to a misoperation of an operator, the first bus bar 12 has a direct current input and/or alternating current inputs whose phases are not synchronized.

Based on the foregoing content, the operator generally may learn in advance whether a line of the power conversion apparatus 10 is of the alternating current mode or the direct current mode. Therefore, the operator may select a first module that matches the mode corresponding to the line of the power conversion apparatus 10. In addition, if a same first bus bar 12 is electrically connected to a plurality of first modules of a same mode by using a corresponding first slot 11 due to a reason such as an improper operation, a mechanical interlocking module or a port configured to receive a software control command (for example, sent by the monitor unit 16/the first module) may be disposed in the first slot 11 in this application, so that the first modules of the same mode do not input electric energy to the first bus bar 12 at the same time. It should be noted that the same mode herein refers to the alternating current mode or the direct current mode.

In this application, the second slot 13 may be further set to a slot that can be reused. Based on this, the second slot 13 may be further electrically connected to a third module, or the second slot 13 may be further electrically connected to a fourth module, or the second slot 13 may be further electrically connected to a third module and a fourth module.

The third module is powered by a direct current on the second bus bar 14. A specific implementation form of the third module is not limited in this application. Optionally, the third module may include any one of a direct current output power distribution module, an output power distribution module such as a protection circuit breaker/fuse/connector, a surge protection power distribution module, a DC/AC module, a boost DC/DC module, a buck DC/DC module, a voltage-regulated DC/DC module, a buck-boost DC/DC module, a module having a direct current output function and a surge protection power distribution function, or a DC/DC and DC/AC multi-output module. Any one of the direct current output power distribution module, the surge protection power distribution module, or the module having the direct current output function and the surge protection power distribution function can support another function such as independently measuring electricity for different paths or independently disconnecting each path, to implement intelligent output.

The fourth module is a power module that can supply, to the second bus bar 14/downstream electric device, electric energy of another type other than electric energy supplied by the first module. A specific implementation form of the fourth module is not limited in this application. Optionally, the fourth module may include any one of a solar input module, a wind energy input module, an energy storage module (for example, a lead-acid battery/lithium battery/fuel cell), a battery management module, or a third-party energy management module (for example, −48 V energy supplied by a user).

In addition, when the fourth module includes any one of the energy storage module, the battery management module, or the third-party energy management module, the fourth module may be electrically connected to a corresponding slot in a plug-in manner, to provide a possibility for the electrical connection between the fourth module and the corresponding slot. Alternatively, the fourth module is electrically connected to a corresponding slot in a copper/aluminum busbar locking manner, so that the fourth module does not need to be plugged in, a plug-in function is deleted, and a high-current through-current capability is improved.

The second slot 13 is electrically connected to both the first bus bar 12 and the second bus bar 14. Therefore, when the third module is electrically connected to the second slot 13, the third module may be provided only with a port used for an electrical connection to the second bus bar 14, or the third module may disconnect an electrical connection between the first bus bar 12 and a port of the second slot 13 electrically connected to the first bus bar 12, so that the second slot 13 not only can be electrically connected to the second module, but also can be electrically connected to the third module, to reuse the second slot 13.

Similarly, when the fourth module is electrically connected to the second slot 13, the fourth module may be provided only with a port used for an electrical connection to the second bus bar 14, or the fourth module may disconnect an electrical connection between the first bus bar 12 and a port of the second slot electrically connected to the first bus bar 12, so that the second slot 13 not only can be electrically connected to the second module, but also can be electrically connected to the fourth module, to reuse the second slot 13.

Similarly, when the third module and the fourth module are electrically connected to the second slot 13, the third module and the fourth module each may be provided only with a port used for an electrical connection to the second bus bar 14, or the third module and the fourth module each may disconnect an electrical connection between the first bus bar 12 and a port of the second slot 13 electrically connected to the first bus bar 12, so that the second slot 13 not only can be electrically connected to the second module, but also can be electrically connected to the third module and the fourth module, to reuse the second slot 13.

Therefore, reusing the second slot 13 not only enables the power conversion apparatus 10 to have a plurality of energy inputs and/or multi-mode energy inputs, to improve compatibility of the power conversion apparatus 10 with energy of different modes, but also enables the power conversion apparatus 10 to have a plurality of energy outputs and/or energy outputs of a plurality of voltage levels, to provide a backup and input energy of a new voltage level for the downstream electric device, and flexibly adapt to various power supply scenarios. In addition, there is no need to add a new power subrack or cabinet to meet an output of a new voltage level, to reduce costs, reduce a volume occupied by the power conversion apparatus 10, and meet an actual requirement for a smaller occupied volume.

With reference to FIG. 2 to FIG. 4, the power conversion apparatus 10 in this application may further include Q third slots 15. Q is a positive integer. Each of the Q third slots 15 is electrically connected to the S second bus bars 14. Generally, when S=1, there is one second bus bar 14, and all of the Q third slots 15 may be electrically connected to an input side of the second bus bar 14, or may be electrically connected to an output side of the second bus bar 14, or may be electrically connected to both an input side and an output side of the second bus bar 14. This is not limited in this application. For ease of description, the third slot 15 in FIG. 2 to FIG. 4 is shown by using a dashed box.

In this application, a quantity of third slots 15 that are electrically connected to an input side and an output side of each second bus bar 14 may be set with reference to actual disposing space of the slot and a power supply requirement. This is not limited in this application.

In this application, the third slot 15 may be further set to a slot that can be reused. Based on this, the third slot 15 may be configured to electrically connect to a third module, or may be configured to electrically connect to a fourth module, or may be configured to electrically connect to a third module and a fourth module. Generally, the third module is electrically connected to a third slot 15 electrically connected to the output side of the second bus bar 14, and the fourth module is electrically connected to a third slot 15 electrically connected to the input side of the second bus bar 14.

The third module is powered by a direct current on the second bus bar 14, and the fourth module is a power module that can supply, to the second bus bar, electric energy of another type other than electric energy supplied by the first module. For specific content of the third module and the fourth module, refer to the foregoing content. Details are not described herein again.

In this application, a manner of the electrical connection between the third slot 15 and the second bus bar 14 may be set based on a manner of an actual connection between the third module and the second bus bar 14 and/or between the fourth module and the second bus bar 14. Because a quantity of wires in the second bus bar 14 is fixed, and usually is 2, in this application, the following setting may be made: one end of the third slot 15 is electrically connected to one wire in the second bus bar 14, and another end of the third slot 15 is electrically connected to the other wire in the second bus bar 14, so that the third module and/or the fourth module are electrically connected to the second bus bar 14 by using the third slot 15.

With reference to FIG. 3 and FIG. 4, Q third slots 15 are further disposed in the power conversion apparatus 10 in this application. One end of each third slot 15 is electrically connected to one wire in the second bus bar 14, and another end of each third slot 15 is electrically connected to the other line in the second bus bar 14. For ease of description, in FIG. 3 and FIG. 4, the Q third slots 15 are divided into Q1 third slots 15 and Q2 third slots 15, a sum of Q1 and Q2 is Q, and Q1 and Q2 are natural numbers.

In the Q third slots 15, some third slots 15 are configured to electrically connect to the third module that uses the direct current on the second bus bar 14 as a power source. Therefore, the power conversion apparatus 10 in this application may further supply, to the downstream electric device, electric energy output at a plurality of voltage levels. The remaining third slot 15 is configured to supply power to the second bus bar 14. Therefore, the power conversion apparatus 10 in this application may be further compatible with a plurality of energy supplies and/or energy supplies of multi-mode voltage inputs, to adapt to different power supply scenarios.

In this application, reusing the third slot 15 not only enables the power conversion apparatus 10 to have a plurality of energy inputs and/or multi-mode energy inputs, to improve compatibility of the power conversion apparatus 10 with energy of different modes, but also enables the power conversion apparatus 10 to have a plurality of energy outputs and/or energy outputs of a plurality of voltage levels, to provide a backup and input energy of a new voltage level for the downstream electric device, and flexibly adapt to various power supply scenarios. In addition, there is no need to add a new power subrack or cabinet to meet an output of a new voltage level, to reduce costs, reduce a volume occupied by the power conversion apparatus 10, and meet an actual requirement for a smaller occupied volume.

In conclusion, on one hand, the power conversion apparatus 10 in this application not only can be connected, through the electrical connection between the first slot 11 and the first module, to energy supplied by the first module, but also can be connected, through the electrical connection between the second slot 13 and the fourth module and/or between the third slot 15 and the fourth module, to another type of energy other than the electric energy supplied by the first module, so that the power conversion apparatus 10 has a plurality of energy inputs and/or multi-mode energy inputs and/or multi-type energy inputs. On the other hand, the power conversion apparatus 10 in this application can adapt, through the electrical connection between the second slot 13 and the fourth module and/or between the third slot 15 and the fourth module, the direct current on the second bus bar 14 for voltages for various power supply scenarios, so that the power conversion apparatus 10 can supply a plurality of paths of energy and/or energy of a plurality of voltage levels to the downstream electric device. In this way, the power conversion apparatus 10 can supply, by using the third module, power to downstream electric devices having various power supply requirements, to meet actual requirements in various power supply scenarios.

It should be noted that in addition to disposing the third slot 15 on the power conversion apparatus 10, in the power conversion apparatus 10 in this application, a power distribution component such as an output shunt, a contactor, or a circuit breaker may be electrically connected to the output end of the second bus bar 14. The output shunt is configured to measure a direct current of the power conversion apparatus 10. The contactor is configured to remotely control automatic closing or disconnection of the contactor, to power on or power off the power conversion apparatus 10. The circuit breaker is used to perform short circuit protection on the power conversion apparatus 10.

Based on the foregoing content, in this application, the monitor unit 16 may monitor (for example, control/schedule) each of the electrically connected slots. A plurality of specific implementations may be included. Optionally, the monitor unit 16 may include a main control module 161. The main control module 161 may be electrically connected to all of the slots (namely, the M first slots 11, the P second slots 13, and the Q third slots 15), or may be electrically connected to some slots (namely, one or more slots in the M first slots 11, the P second slots 13, and the Q third slots 15). Generally, the main control module 161 may be electrically connected to all of the P second slots 13.

Therefore, the main control module 161 may monitor a module electrically connected to a corresponding slot, to control/schedule the module electrically connected to each slot, so that the power conversion apparatus 10 smoothly supplies power. In this way, the power conversion apparatus 10 in this application can supply power by monitoring the modules by using the main control module 161, to reduce costs and simplify a design.

A specific implementation form of the main control module 161 is not limited in this application. In addition, a manner of an electrical connection between the main control module 161 and any slot is not limited in this application. For example, to reduce a quantity of ports of the main control module 161, the main control module 161 may be electrically connected to all of the slots by using one port. In addition, the main control module 161 may be further electrically connected to the output end of the second bus bar 14, so that energy on the second bus bar 14 can be used as a power source of the main control module 161.

In this application, in addition to including the main control module 161 electrically connected to the slot for controlling/scheduling, the monitor unit 16 may further have another function, for example, monitoring a peripheral environment status of the power conversion apparatus 10. The following describes a specific structure of the monitor unit 16 in this application by way of example with reference to FIG. 5 and FIG. 6.

Figure 5:
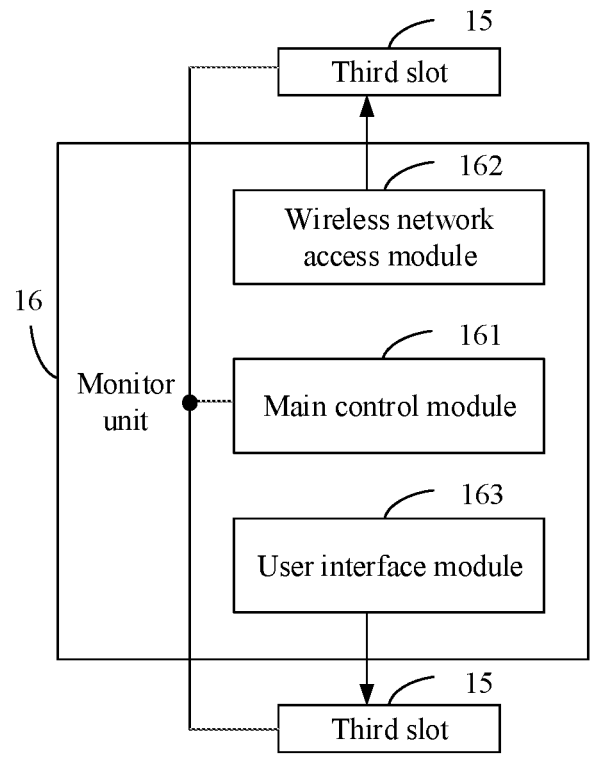
FIG. 5 is a schematic connection diagram of a monitor unit in the power conversion apparatus according to an embodiment of this application.
Figure 6:
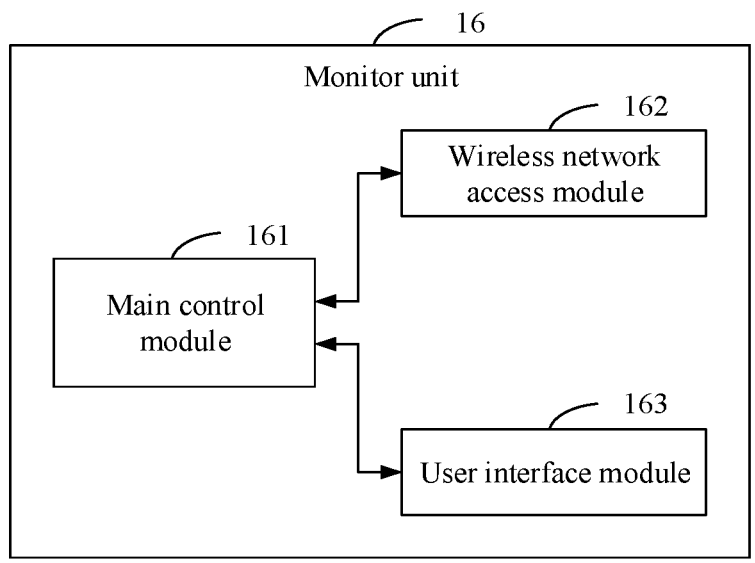
FIG. 6 is a schematic connection diagram of a monitor unit in the power conversion apparatus according to another embodiment of this application.

FIG. 5 and FIG. 6 are schematic connection diagrams of the monitor unit 16 in the power system shown in FIG. 2 to FIG. 4. As shown in FIG. 5 and FIG. 6, optionally, the monitor unit 16 may further include a wireless network access module 162. The wireless network access module 162 may be electrically connected to a slot electrically connected to the second bus bar 14, or the wireless network access module 162 may be electrically connected to the main control module 161. The slot electrically connected to the second bus bar 14 herein may include but is not limited to any one of the second slot 13, the third slot 15, or a newly added slot. For ease of description, in FIG. 5, illustration is provided by using an example in which the wireless network access module 162 is electrically connected to the third slot 15.

In FIG. 5, the wireless network access module 162 may be electrically connected to the slot electrically connected to the second bus bar 14, so that the main control module 161 is electrically connected to the wireless network access module 162 by using the slot electrically connected to the second bus bar 14, to provide a possibility of an electrical connection between the wireless network access module 162 and the main control module 161. Therefore, in the power conversion apparatus 10, an external connection of the wireless network access module 162 is implemented by supporting the electrical connection between the wireless network access module 162 and the slot that is electrically connected to the second bus bar 14, to improve design flexibility.

In FIG. 6, the wireless network access module 162 may be further directly electrically connected to the main control module 161 without using a connection path to the slot electrically connected to the second bus bar 14, to reduce a data transmission amount on a connection path formed when the main control module 161 is electrically connected to the slot electrically connected to the second bus bar 14, increase a processing speed of the main control module 161, reduce a difficulty in slot compatibility design, and reduce costs.

In this application, the wireless network access module 162 may implement out-of-band networking through module dialing, and the wireless network access module 162 is configured to separately communicate with the main control module 161 and an upper-layer network management device in a wireless manner. Therefore, the wireless network access module 162 receives a first signal from the main control module 161 in a wireless manner, where the first signal may be used to indicate parameters such as a working status of the power conversion apparatus 10. The wireless network access module 162 transmits the first signal to the upper-layer network management device in a wireless manner, so that the upper-layer network management device sends a second signal to the wireless network access module 162 based on the first signal, where the second signal is a signal used to control, based on the working status of the power conversion apparatus 10 represented by the first signal, the main control module 161 to perform a corresponding operation on a module. Then, the wireless network access module 162 sends the second signal to the main control module 161 in a wireless manner, so that the main control module 161 can perform the corresponding operation on the corresponding module based on the second signal.

Therefore, the upper-layer network management device can monitor the working status of the power conversion apparatus 10 in real time by using the wireless network access module 162, learn a power supply status of the power conversion apparatus 10 in time, and adjust the power conversion apparatus 10 in time. Further, the main control module 161 may respond to an instruction of the upper-layer network management device by using the wireless network access module 162, and perform the corresponding operation on the corresponding module, so that the power conversion apparatus 10 adapts to various power supply scenarios.

A specific implementation of the upper-layer network management device is not limited in this application. For example, the upper-layer network management device may include a monitor center, a mobile terminal, a workstation, or the like. In addition, specific representation forms of the first signal and the second signal are not limited in this application.

With reference to FIG. 5 and FIG. 6, optionally, the monitor unit 16 may further include a user interface module 163. The user interface module 163 may be electrically connected to a slot electrically connected to the second bus bar 14, or the user interface module 163 may be electrically connected to the main control module 161. The slot electrically connected to the second bus bar 14 herein may include but is not limited to any one of the second slot 13, the third slot 15, or a newly added slot. For ease of description, in FIG. 5, illustration is provided by using an example in which the user interface module 163 is electrically connected to the third slot 15.

In FIG. 5, the user interface module 163 may be electrically connected to the slot electrically connected to the second bus bar 14, so that the main control module 161 is electrically connected to the user interface module 163 by using the slot electrically connected to the second bus bar 14, to provide a possibility of the electrical connection between the user interface module 163 and the main control module 161. Therefore, in the power conversion apparatus 10, an external connection of the user interface module 163 is implemented by using the slot that supports the electrical connection between the wireless network access module 162 and the second bus bar 14, to improve design flexibility.

In FIG. 6, the user interface module 163 may be further directly electrically connected to the main control module 161 without using a connection path to the slot electrically connected to the second bus bar 14, to reduce a data transmission amount on a connection path formed when the main control module 161 is electrically connected to the slot electrically connected to the second bus bar 14, increase a processing speed of the main control module 161, reduce a difficulty in slot compatibility design, and reduce costs.

In this application, the user interface module 163 may be configured to monitor a lower-layer device through a dry contact interface, an analog parameter interface, or at least one manner in a software protocol. In addition, the user interface module 163 may send, to the main control module 161 through the electrical connection to the main control module 161, a signal used to indicate a working status of the lower-layer device, so that the main control module 161 can monitor the working status of the lower-layer device in real time by using the user interface module 163, to monitor a power supply environment of the power conversion apparatus 10 in real time, and ensure that the power conversion apparatus 10 can smoothly supply power to the downstream electric device.

A specific implementation of the lower-layer device is not limited in this application. For example, the lower-layer device may include a battery temperature sensor, an ambient temperature and humidity sensor, an infrared sensor, a smoke sensor, a water sensor, an audible and visual alarm, a door magnetic switch, an electric lock, a camera, a GPS, an air conditioner, or the like. In addition, the software protocol may include an asynchronous transfer standard interface (RS232) protocol, an RS485 protocol, Modbus (Modbus protocol), an I2C bus protocol, a transmission control protocol/internet protocol (Transmission Control Protocol/Internet Protocol, TCP/IP), a controller area network (ControllerArea Network, CAN) bus protocol, a zigbee protocol, a dedicated protocol, or the like.

It should be noted that the monitor unit 16 may include the main control module 161, or may include the main control module 161 and the wireless network access module 162, or may include the main control module 161 and the user interface module 163, or may include the main control module 161, the wireless network access module 162, and the user interface module 163, or may include the main control module 161, the wireless network access module 162, the user interface module 163, and another module. This is not limited in this application.

Figure 7:
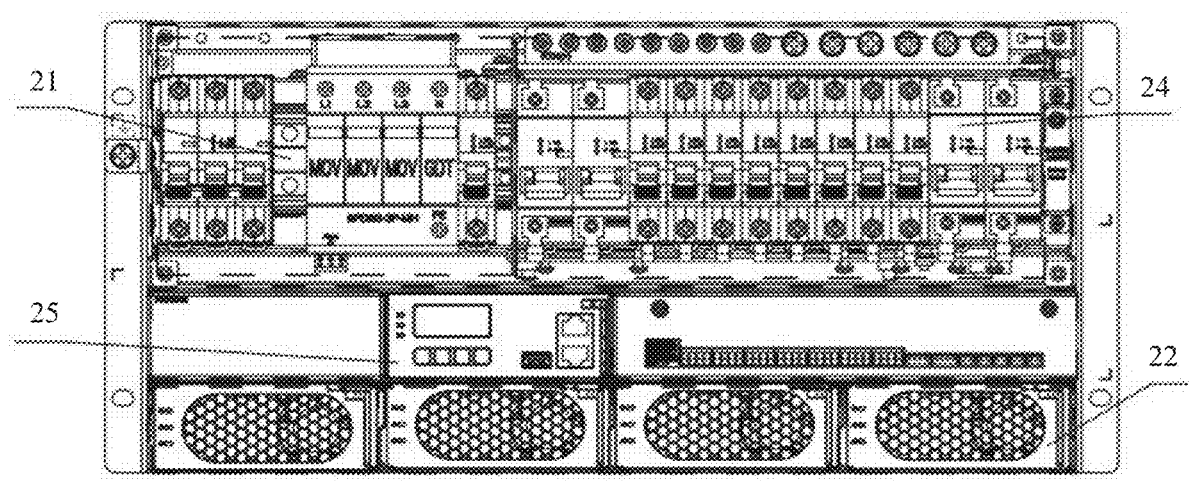
FIG. 7 is a schematic diagram of slots in a communications power system in the prior art.
Figure 8:
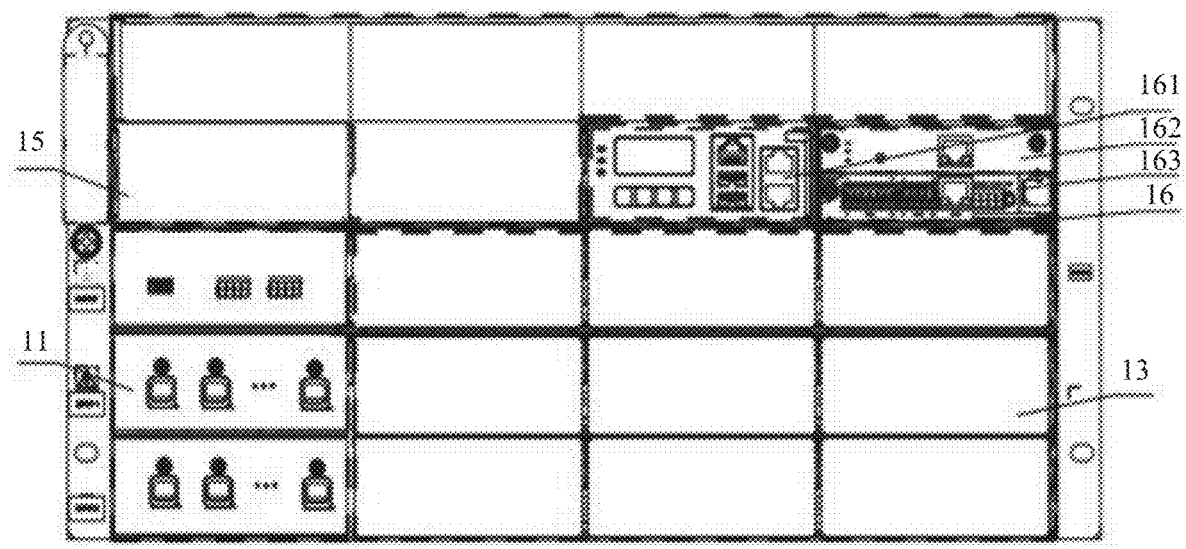
FIG. 8 is a schematic diagram of slots in a power conversion apparatus according to an embodiment of this application.
Figure 9:
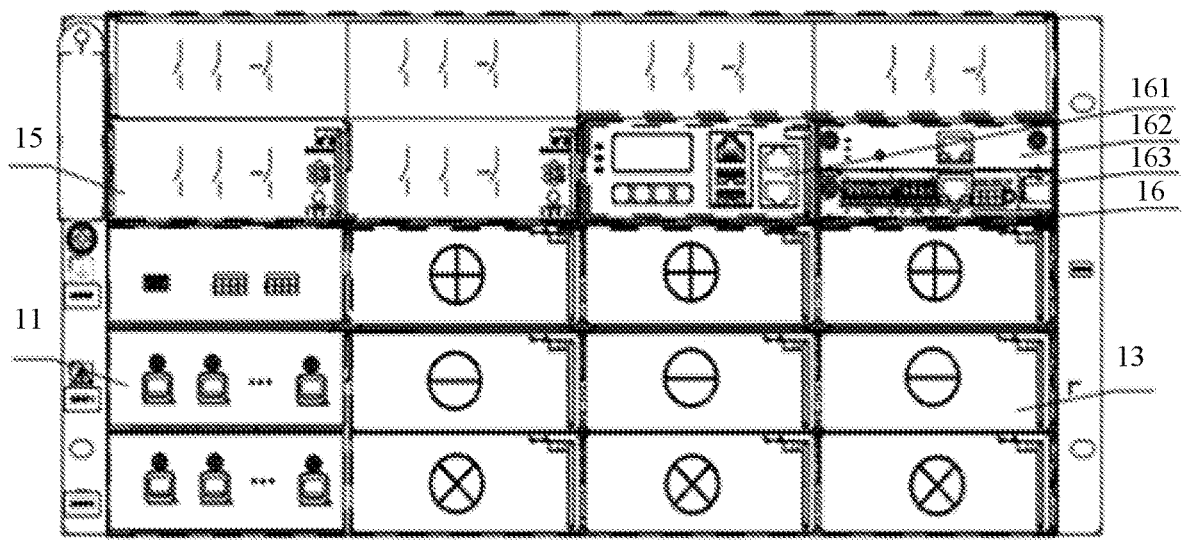
FIG. 9 is a schematic diagram showing that each slot in a power conversion apparatus is electrically connected to a corresponding module according to an embodiment of this application.

The following compares the communications power system 2 with the power conversion apparatus 10 in this application with reference to FIG. 7 to FIG. 9.

FIG. 7 is a schematic structural diagram of slots in the communications power system 2 in FIG. 1. As shown in FIG. 7, each slot corresponds to an interface of each component in the communications power system 2, and an interface of the direct current surge protection device 23 is not shown. Because an electrical connection relationship between the components is fixed, the components electrically connected to the slots are also fixed. As a result, for the communications power system 2, an input voltage mode is fixed, a quantity of inputs is limited, and a quantity of voltage outputs is limited.

FIG. 8 is a schematic diagram of slots in the power conversion apparatus 10 in FIG. 2 to FIG. 6, and FIG. 9 is a schematic diagram showing that each slot in the power conversion apparatus 10 in FIG. 8 is electrically connected to a corresponding module. As shown in FIG. 8 and FIG. 9, the power conversion apparatus 10 in this application includes one or more first slots 11 configured to electrically connect to a first module of an alternating current mode, one or more first slots 11 configured to electrically connect to a module having an alternating current output function, one or more first slots 11 configured to electrically connect to a module having a surge protection function or a metering function, one or more second slots 13 configured to electrically connect to a second module that converts an alternating current into a direct current, one or more second slots 13 configured to electrically connect to a second module that converts a direct current into a direct current, one or more third slots 15 configured to electrically connect to a direct current output power distribution module, one or more third slots 15 configured to electrically connect to a DC/AC module, one or more third slots 15 configured to electrically connect to a fourth module, one or more third slots 15 configured to electrically connect to an output power distribution module such as a protection circuit breaker/fuse/connector, one or more third slots 15 configured to electrically connect to a surge protection power distribution module, one or more third slots 15 configured to electrically connect to a battery management module, one or more third slots 15 configured to electrically connect to a third module and/or a fourth module, and an interface of the main control module 161, an interface of the wireless network access module 162, and an interface of the user interface module 163 in the monitor unit 16.

Therefore, compared with the communications power system 2 in FIG. 7, the power conversion apparatus 10 in FIG. 8 in this application occupies nearly same space to achieve the following advantages: Based on a modular design of a slot and a bus bar, and based on an electrical connection between a slot and a module, the bus bar can adapt to voltage inputs of different modes and/or a plurality of voltage inputs, to connect to energy of various types and/or a plurality of paths of energy and/or energy of various modes, and the bus bar can supply a plurality of voltage outputs and/or voltage outputs of a plurality of voltage levels to the downstream electric device, to meet a multiple-input multiple-output power supply requirement.

In a specific embodiment, an example in which the power conversion apparatus 10 implements two alternating current inputs, two other types of energy inputs, and direct current outputs of a plurality of voltage levels and/or a plurality of direct current outputs by using a typical input scenario of alternating current input+diesel generator+photovoltaic panel+battery backup is used, and a specific process in which each slot in the power conversion apparatus 10 in this application is connected to a corresponding module in a plug-in manner may include the following:

With reference to FIG. 8 and FIG. 9, in the M first slots 11, two first slots 11 may be respectively connected to two first modules in a plug-in manner, one first slot 11 is connected to a diesel generator in a plug-in manner, the other first slot 11 is connected to a mains supply in a plug-in manner, and a mechanical interlocking apparatus is disposed between the first slots 11 of the two slots, to implement two alternating current inputs. Optionally, if there is an alternating current load such as an ICT device in downstream user equipment, the remaining first slot 11 in the M first slots 11 may be further connected, in a plug-in manner, to a module having at least one of an alternating current output function, a surge protection function, a metering function, or the like.

In the P second slots 13, one second slot 13 may be connected to one second module in a plug-in manner, and the second module is a rectifier module.

If there is an alternating current primary load such as an alternating current snapshot flashing light or an alternating current server in the downstream electric device, in the P second slots 13 and the Q third slots 15, one slot (namely, one second slot 13 or one third slot 15) may be connected to one third module in a plug-in manner, and the third module is an inverter module.

In the P second slots 13 and the Q third slots 15, two slots (namely, two second slots 13, two third slots 15, or one second slot 13 and one third slot 15) may be respectively connected to two fourth modules in a plug-in manner, where one third slot 15 is connected to a solar module (for example, a photovoltaic panel) in a plug-in manner, and the other third slot 15 is connected to a battery management module (for example, a battery) in a plug-in manner.

In conclusion, based on the foregoing simple plug-in operation, the power conversion apparatus 10 in this application can form a power supply scenario that meets a plurality of energy inputs from a plurality of power sources and a plurality of energy outputs of a plurality of voltage levels.

In another specific embodiment, an example in which the alternating current input of the power conversion apparatus 10 includes only two 32 A/3 P circuit breakers, but does not include a 63 A/3 P circuit breaker, and the direct current input of the power conversion apparatus 10 includes only one 100 Ah lead-acid battery, and a load current of the battery is 400 A, to implement two inputs and a high-current direct current output is used, and a specific process in which each slot in the power conversion apparatus 10 in this application is connected to a corresponding module in a plug-in manner may include the following:

Still with reference to FIG. 8 and FIG. 9, in the M first slots 11, each of two first slots 11 is electrically connected to one first module. One first slot 11 is connected to one 32 A/3 P circuit breaker in a plug-in manner, and the first slot 11 is electrically connected to one first bus bar 12. The other first slot 11 is connected to one 32 A/3 P circuit breaker in a plug-in manner, and the first slot 11 is electrically connected to another first bus bar 12.

In the P second slots 13, one second slot 13 may be connected to one second module in a plug-in manner, and the second module is a DC/DC module.

In the P second slots 13 and the Q third slots 15, one slot (namely, one second slot 13 or one third slot 15) may be connected to one fourth module in a plug-in manner. The fourth module is a 100 Ah lead-acid battery, and a load current of the battery is 400 A.

In the P second slots 13 and the Q third slots 15, one slot (namely, one second slot 13 or one third slot 15) may be connected to one third module in a plug-in manner, and the third module is a direct current output power distribution module.

In conclusion, based on the foregoing simple plug-in operation and locking manner, the power conversion apparatus 10 in this application can implement high-current power supply.

Figure 10:
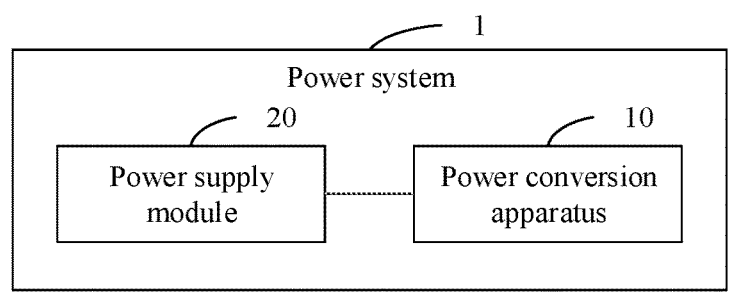
FIG. 10 is a schematic structural diagram of a power system according to an embodiment of this application.

For example, this application further provides a power system 1. FIG. 10 is a schematic structural diagram of the power system according to an embodiment of this application. As shown in FIG. 10, the power system 1 in this application includes a power supply module 20 and a power conversion apparatus 10. The power supply module 20 may include a direct current power module and/or an alternating current power module. The power conversion apparatus 10 may include specific implementation structures of the embodiments shown in FIG. 2 to FIG. 6, and FIG. 8 and FIG. 9. Implementation principles and technical effects thereof are similar. For implementation operations of modules in the power conversion module, refer to related descriptions in the embodiment. Details are not described herein again.

In the power conversion apparatus included in the power system provided in this application, each of M first slots is electrically connected to an input side of one of N first bus bars, the first slot is configured to electrically connect to a first module, and the first module is a power module that can supply an alternating current or a direct current to the first bus bar electrically connected to the first slot, so that a plurality of energy inputs and/or multi-mode energy inputs can be supplied by using the first bus bar and the first slot, to avoid a power failure risk caused by a single fixed-mode energy input. Each of P second slots is electrically connected between an output side of one of the N first bus bars and an input side of one of S second bus bars, the second slot is configured to electrically connect to a second module, and the second module is a module that converts an alternating current into a direct current, and/or a module that converts a direct current into a direct current, so that direct current or alternating current energy can be converted by using the second slot, to supply power to the S second bus bars, and a plurality of energy outputs can be implemented by using the S second bus bars, to provide a backup for a downstream electric device, and flexibly adapt to various power supply scenarios. A monitor unit is electrically connected to all or some slots, and is configured to monitor a module electrically connected to a corresponding slot, so that the monitor unit can monitor, in real time, the module connected by using the slot, to control/schedule the module connected by using the slot. In this way, the power system meets a multiple-input multiple-output power supply requirement by using the power conversion apparatus, to improve power supply reliability of the power system. In addition, based on a manner of an electrical connection, for example, plug-in or fixing and locking, between a module and a slot in the power conversion apparatus, an overall design of the power system is simple, and facilitates capacity expansion and maintenance.

What is claimed is:

1. A power conversion apparatus, comprising:
a monitor device;
M first slots;
N first bus bars;
P second slots; and
S second bus bars;
wherein M, N, P, and S are positive integers;
wherein each of the M first slots is electrically connected to an input side of one of the N first bus bars, wherein a respective first slot of the M first slots is configured to electrically connect to a power supply for supplying an alternating current or a direct current to a respective first bus bar electrically connected to the first slot;
wherein each of the P second slots is electrically connected between an output side of one of the N first bus bars and an input side of one of the S second bus bars and each of the P second slots is configured to electrically connect to a converter for converting an alternating current into a direct current or converting a direct current into a direct current;
wherein the S second bus bars are configured to supply a direct current to a downstream electric device; and
wherein the monitor device is electrically connected to one or more of the M first slots and the P second slots for monitoring respective components connected to the one or more of the M first slots and the P second slots.

2. The apparatus according to claim 1, wherein:
a first slot corresponding to a first bus bar is configured to be capable of electrically connecting to a plurality of power supplies, and all of the plurality of power supplies are alternating current modules, wherein in the plurality of power supplies, one power supply supplies an alternating current to the first bus bar, remaining power supply(ies) is/are electrically disconnected from the first bus bar, and a working status of the remaining power supply(ies) is/are locked; or
a first slot corresponding to a first bus bar is configured to be capable of electrically connecting to a plurality of power supplies, and all of the plurality of power supplies are direct current modules, wherein in the plurality of power supplies, at least one power supply supplies a direct current to the first bus bar; or
a first slot corresponding to a first bus bar is configured to be capable of electrically connecting to a plurality of power supplies, and the plurality of power supplies are modules of different modes, wherein in the plurality of power supplies of different modes, one power supply supplies an alternating current or a direct current to the first bus bar, the remaining power supply(ies) is/are electrically disconnected from the first bus bar, and a working status of the remaining power supply(ies) is/are locked.

3. The apparatus according to claim 1, wherein each of the N first bus bars comprises:
- a dual-live-wire mode comprising an L1 phase wire and an L2 phase wire; or
- a three-live-wire mode comprising an L1 phase wire, an L2 phase wire, and an L3 phase wire; or
- a three-phase four-wire mode comprising an L1 phase wire, an L2 phase wire, an L3 phase wire, and an N neutral wire; or
- a three-phase five-wire mode comprising an L1 phase wire, an L2 phase wire, an L3 phase wire, an N neutral wire, and a PE ground cable; or
- direct current positive and direct current negative bus bars of a direct current mode.

4. The apparatus according to claim 3, wherein:
- a first slot corresponding to a first bus bar is configured to be capable of electrically connecting to a plurality of power supplies, and all of the plurality of power supplies are alternating current modules, wherein in the plurality of power supplies, one power supply supplies an alternating current to the first bus bar, remaining power supply(ies) is/are electrically disconnected from the first bus bar, and a working status of the remaining power supply(ies) is/are locked; or
- a first slot corresponding to a first bus bar is configured to be capable of electrically connecting to a plurality of power supplies, and all of the plurality of power supplies are direct current modules, wherein in the plurality of power supplies, at least one power supply supplies a direct current to the first bus bar; or
- a first slot corresponding to a first bus bar is configured to be capable of electrically connecting to a plurality of power supplies, and the plurality of power supplies are modules of different modes, wherein in the plurality of power supplies of different modes, one power supply supplies an alternating current or a direct current to the first bus bar, the remaining power supply(ies) is/are electrically disconnected from the first bus bar, and a working status of the remaining power supply(ies) is/are locked.

5. The apparatus according to claim 1, wherein the first slot is further configured to electrically connect to a direct current output, an alternating current output, a surge protector, or a meter.

6. The apparatus according to claim 1, wherein the converter comprises a DC/DC converter or an AC/DC converter.

7. The apparatus according to claim 1, wherein the S second bus bars comprise direct current positive and direct current negative bus bars of a direct current mode.

8. The apparatus according to claim 7, further comprising:
Q third slots;
wherein Q is a positive integer;
wherein each of the Q third slots is electrically connected to one of the S second bus bars, wherein a respective third slot of the Q third slots is configured to electrically connect to a direct current source or to another power supply configured to supply, to the one of the S second bus bars, a different type of electric energy than the power supply.

9. The apparatus according to claim 1, wherein each of the P second slots is further configured to electrically connect to a direct current source or to another power supply, wherein the direct current source or the another power supply is configured to supply, to one of the second bus bars, a different type of electric energy than the power supply.

10. The apparatus according to claim 9, wherein the direct current source comprises a direct current output power distributor, a surge protection power distributor, a DC/AC converter, a boost DC/DC converter, a buck DC/DC converter, a voltage-regulated DC/DC converter, a buck-boost DC/DC converter, or a DC/DC and DC/AC multi-output converter.

11. The apparatus according to claim 9, wherein the another power supply comprises a solar input, a wind energy input, an energy storage, a battery manager, or a third-party energy manager.

12. The apparatus according to claim 9, wherein the another power supply comprises an energy storage, a battery manager, or a third-party energy manager, and
wherein the another power supply is electrically connected to an associated one of the P second slots in a plug-in manner or a copper/aluminum busbar locking manner.

13. The apparatus according to claim 1, wherein the monitor device comprises a main controller electrically connected to the one or more of the M first slots and the P second slots, wherein the main controller is configured to monitor the respective components connected to the one or more of the M first slots and the P second slots.

14. The apparatus according to claim 13, wherein the monitor device further comprises:
- a wireless network access interface electrically connected to one of the P second slots, which is electrically connected to one of the second bus bars, wherein the main controller is further configured to monitor the upper-layer network management device by using the wireless network access interface; or
- a wireless network access module electrically connected to the main controller, wherein the wireless network access module is configured to communicate with the main controller and an upper-layer network management device in a wireless manner.

15. The apparatus according to claim 13, wherein the monitor device further comprises:
a user interface;
wherein the user interface is electrically connected to the slot electrically connected to the second bus bar, or the user interface is electrically connected to the main controller;
wherein the user interface is configured to monitor a lower-layer device through a dry contact interface, an analog parameter interface, or via a software protocol; and
wherein the main controller is further configured to monitor the lower-layer device by using the user interface.

16. A power system, comprising:
a power supply; and
a power conversion apparatus;
wherein the power supply comprises a direct current power supply or an alternating current power supply;
wherein the power conversion apparatus comprises a monitor device, M first slots, N first bus bars, P second slots, and S second bus bars, wherein M, N, P, and S are positive integers;
wherein each of the M first slots is electrically connected to an input side of one of the N first bus bars, wherein a respective first slot of the M first slots is configured to electrically connect to the power supply, wherein the power supply is configured to supply an alternating current or a direct current to the first bus bar electrically connected to the first slot;

wherein each of the P second slots is electrically connected between an output side of one of the N first bus bars and an input side of one of the S second bus bars, wherein a respective second slot of the P second slots is configured to electrically connect to a converter for converting an alternating current into a direct current or converting a direct current into a direct current;

wherein the S second bus bars are configured to supply a direct current to a downstream electric device; and wherein the monitor device is electrically connected to one or more of the M first slots and the P second slots for monitoring respective components connected to the one or more of the M first slots and the P second slots.

* * * * *